United States Patent [19]

Tarleton

[11] 4,439,805

[45] Mar. 27, 1984

[54] LOW VOLTAGE PROTECTION CIRCUIT

[75] Inventor: George K. Tarleton, Itasca, Ill.

[73] Assignee: GTE Automatic Electric Labs Inc., Northlake, Ill.

[21] Appl. No.: 380,484

[22] Filed: May 21, 1982

[51] Int. Cl.³ .............................................. H02H 3/24
[52] U.S. Cl. ..................................... 361/92; 361/187; 364/184
[58] Field of Search ...................... 361/86, 90, 91, 187, 361/188, 92; 340/663; 307/130, 140, 355, 358, 363; 364/184, 185

[56] References Cited

U.S. PATENT DOCUMENTS 3,725,675  4/1973  Olsen ................................. 361/92 X
4,099,068  7/1978  Kobayashi et al. ............... 361/92 X
4,238,696  12/1980  Smart .............................. 361/187 X

OTHER PUBLICATIONS

National Semiconductor CMOS Databook pp. 5-6.

*Primary Examiner*—Harry E. Moose, Jr.
*Attorney, Agent, or Firm*—Gregory G. Hendricks; Robert J. Black

[57] ABSTRACT

A low voltage protection which prevents an associated circuit from generating erroneous signals during power-up, power-down or power failure conditions. A voltage comparison circuit, powered by a first power supply, detects low voltage conditions in a second power supply and causes a switching circuit to inhibit control and power signals of the associated circuit.

12 Claims, 1 Drawing Figure

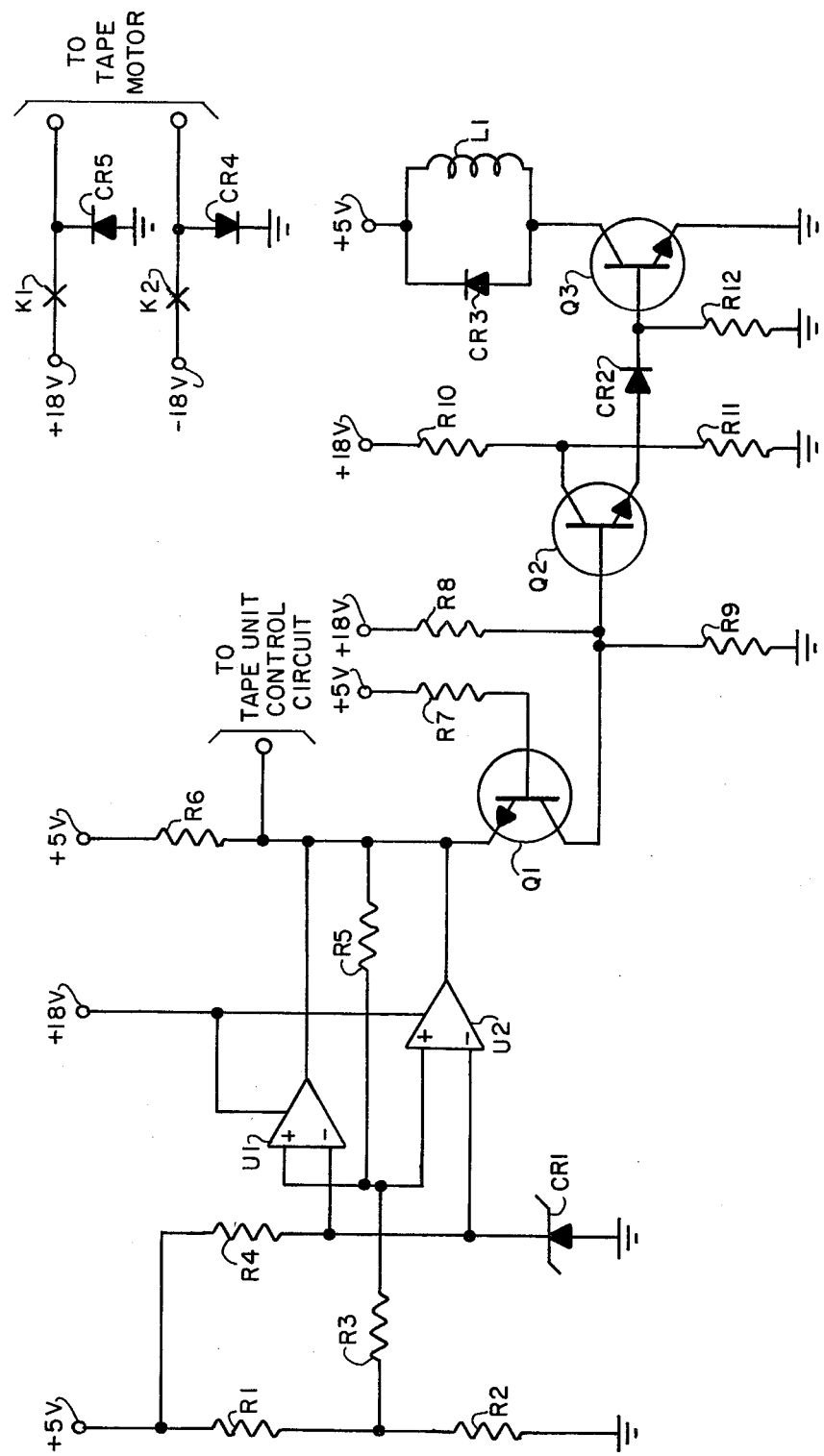

LOW VOLTAGE PROTECTION CIRCUIT

BACKGROUND OF THE INVENTION

1. Field of the Invention

The present invention relates to voltage monitoring circuits and more particularly to a low voltage protection circuit for use with an associated circuit, such as a magnetic tape unit. The low voltage protection circuit prevents generation of erroneous control signals during fluctuations in an associated power supply. An application of such circuit could be to prevent a magnetic tape unit from generating erroneous magnetic tape control and power signals.

2. Description of the Prior Art

Power supplies can cause logic circuitry to produce erratic signals during power supply fluctuations caused by power-up, power-down or power failure conditions. These erratic signals can result in catastrophic equipment failure conditions since erroneous control signals can cause abnormal operations. If these erratic signals are applied to a magnetic tape unit, for example, it can be caused to completely unwind the magnetic tape from its spool and thereby prevent further automatic use of that tape.

Typically 5 volt power supplies are used for logic circuitry and ±18 volt power supplies are used for magnetic tape motor circuitry. Usually these two power supplies rise and decay at rates that do not cause erratic tape control signals. However, due to component tolerances or frequency of power fluctuations, erroneous tape control signals can result and thereby cause erroneous tape motion.

Accordingly, it is the object of the present invention to provide a low voltage protection circuit which can inhibit control and power signals in response to detection of low voltage conditions and which is itself not subject to erroneous operation due to such low voltage conditions.

SUMMARY OF THE INVENTION

The present invention is a circuit which inhibits control and power signals in response to detection of low voltage conditions. The logic circuitry of an associated circuit, e.g. magnetic tape unit, is typically powered by a 5 volt power supply. If the voltage of this power supply drops below 4 volts the magnetic tape control signals become erratic and may cause the tape motor to move the magnetic tape. This tape motor is typically controlled by a ±18 volt supply and continues to run even as the voltage of this supply declines.

Upon detection of an out of tolerance 5 volt supply voltage the present invention inhibits magnetic tape control signals and disconnects the ±18 volt power supply from the magnetic tape motor circuit.

The present invention includes a voltage comparison circuit and a switching circuit. The voltage comparison circuit, which is powered by the 18 volt power supply, upon detection of a low voltage condition in the 5 volt power supply, causes the switching circuit to disable the magnetic tape unit control circuitry and disconnect the ±18 volt power supply from the magnetic tape motor circuit. This invention thus prevents the tape from moving when there are unstable power conditions even though the circuitry of this invention is powered by the same unstable power supply.

DESCRIPTION OF THE DRAWING

The single FIGURE of the accompanying drawing is a schematic diagram of a low voltage protection circuit in accordance with the present invention.

DESCRIPTION OF THE PREFERRED EMBODIMENT

Referring now to the accompanying drawing the low voltage protection circuit of the present invention is shown. Voltage comparators U1 and U2 are shown with their positive inputs connected to voltage divider R1 and R2 via resistor R3. The negative inputs of these comparators are connected to zener diode CR1 and resistor R4. The outputs of these comparators are connected to the positive inputs via resistor R5, to the tape unit control circuitry, pull-up resistor R6 and the emitter of transistor Q1. The collector of this transistor is connected to the base of transistor Q2 whose emitter is connected to the base of relay drive transistor Q3. The collector of this transistor is connected to a 5 volt supply via relay L-1 whose make contacts, K1 and K2, are connected between the tape unit and the ±18 volt power supplies. Comparators U1 and U2, and transistor Q2 are supplied by an 18 volt power supply while the inputs to these comparators and the base of Q1 are connected to the 5 volt power supply.

Zener diode CR1 provides a 3.3 volt reference potential to the negative input of comparators U1 and U2. These comparators monitor the 5 volt power supply via resistor R3 and voltage divider R1 and R2. Resistors R3 and R5 are provided to supply 0.2 V positive feedback to the inputs of the comparators. This prevents oscillations when the voltage of the positive inputs is equal to voltage of the negative inputs. With this arrangement these comparators detect negative fluctuations in the 5 volt supply. Under normal conditions the 5 volt power supply causes a voltage above 3.3 volts to be applied to the positive inputs of amplifiers U1 and U2. Therefore these amplifiers provided a logic level 1 signal at their output, thereby enabling the magnetic tape unit control circuit and also turning off transistor Q1. When transistor Q1 is turned off base drive current is available to transistor Q2 and it turns on, thereby supplying base current to transistor Q3 which also turns on and operates relay L-1. When relay L-1 operates, its make contacts K1 and K2 connect the ±18 volt power supplies to the tape unit. Therefore under normal conditions the tape unit control circuit is enabled and power is applied to the tape motor.

If the 5 volt supply drops to below 4.5 volts the resultant voltage applied to the positive input of these comparators is 3.3 volts. Under these conditions comparators U1 and U2 then cause a logic level 0 signal to appear at their output thereby disabling the tape unit control circuit and turning on transistor Q1.

When transistor Q1 turns on it removes base drive current from transistor Q2 thereby turning it off. Since the base of transistor Q3 is connected to the emitter of transistor Q2, transistor Q3 also turns off when transistor Q2 turns off and this causes relay R1 to release its make contacts, K1 and K2, thereby removing the ±18 volt power supplies from the tape motor. Thus when the 5 volt power supply drops to 4.5 volts or lower both the control signals from the tape unit are inhibited, due to disabling of the tape unit control circuit, and the power for the tape motor is removed. Under these conditions the magnetic tape will not move in response to a negative fluctuation in the 5 volt power supply since neither the control signals nor the power required to move the tape are available to the tape motor.

The power supplies also fluctuate during power-up and power-down conditions. During such power-up conditions the ±18 volt supply can rise at a faster or slower rate than the 5 volt supply. If the ±18 volt supply is at least 1.2 volts greater than the 5 volt supply as the voltages of these supplies rise then comparator chips U1 and U2 begin working when the 18 volt supply provides an output greater than 2 volts. Under these conditions the 5 volt supply is not high enough to erroneously operate relay R1, since 4.5 volts are required for its operation. Once the comparator starts working the tape unit control circuit becomes disabled until the 5 volt supply reaches normal operating levels of at least 4.5 volts. Thus during these power-up conditions neither the relay connecting the ±18 volt supplies to the tape drive nor the control circuit of the tape unit is operated and thus there is no possibility of erroneous tape movement.

If the ±18 volt supply trails the 5 volt supply as these supplies rise, the comparator circuit will not operate. Thus the tape unit control circuit will not be disabled and there is a potential for erroneous control signals being applied to the tape motor circuit. However, under these conditions, the base drive to relay drive transistor Q3 is insufficient to operate transistor Q3 and relay L-1 until the 18 volt supply reaches approximately 9 volts. Therefore the ±18 volt supplies are not connected to the tape drive until the ±18 volt supply reaches the 9 volt level and thus even though the tape unit may receive erroneous control signals it does not receive the power required to move the tape since transistor Q3 does not operate relay L-1.

However, the comparator circuit does begin working long before the ±18 volt supply reaches the 9 volt level. When the 5 volt supply reaches the 4.5 volt level, 3.3 volts are applied to the inputs of comparators U1 and U2. The tape unit control circuit will then become enabled and provide valid control signals since there is sufficient 5 volt power. Thus valid control signals are provided long before the 18 volt supply reaches the 9 volt level required to operate relay L-1 and connect the ±18 volts supplies to the tape motor. Consequently, there is also no possibility of erroneous tape movement on power-up conditions when the +18 volt supply trails the +5 volt supply as they rise to full power status.

During power-down conditions when the 5 volt supply drops below the 4.5 volt level and the 18 volt supply is greater than about 7 volts, the comparator circuits again disable the tape unit control circuit by providing a logic level 0 signal at their outputs. Under these conditions transistor Q1 is turned on, and therefore, transistors Q2 and Q3 are turned off causing relay L-1 to drop. Make contacts K1 and K2 are therefore released and the 18 volt supplies are disconnected from the tape motor. Since the tape unit control circuit is disabled before the relay is dropped this ensures that erroneous signals are not applied to the tape motor circuitry even during the time required to drop relay L-1 and remove the ±18 volt supplies from the tape motor.

Since the base drive to transistor Q3 is supplied by the 18 volt supply, relay L-1 drops when the 18 volt supply falls to the 7 volt level thereby disconnecting the ±18 volt supplies from the tape motor before the comparators stop working. Thus erroneous operation is also prevented when the ±18 volt supplies declines faster than the 5 volt supply during power-down conditions.

Two amplifiers U1 and U2 are used to provide sufficient current sinking capability to disable the tape unit. These amplifiers are powered by the 18 volt supply to ensure their correct operation during fluctuations in the 5 volt power supply. Transistor Q1 is powered by the 5 volt supply to isolate transistor Q2 from the comparators and resistor R6, the tape unit select pull-up resistor. Transistor Q2 is powered by the 18 volt supply to prevent relay L-1 from turning on before the comparators operate properly.

The present low voltage protection circuit thus prevents erroneous power and control signals during power fluctuations caused by either power-up, power-down or power failure conditions. This is achieved through use of the novel circuitry and power supply configurations presented in this invention.

It will be obvious to those skilled in the art that numerous modifications of the present invention can be made without departing from the spirit of the invention which shall be limited only by the scope of the claims appended hereto.

What is claimed is:

1. A low voltage protection circuit for use with a magnetic tape unit, including a control circuit, a tape motor and first and second power sources, said protection circuit comprising:
   voltage monitoring means connected to said first power source, operated in response to said first power source having a voltage above a pre-determined level to provide a voltage detected signal;
   said voltage monitoring means is further operated in response to said first power source having a voltage above said pre-determined level to enable said control circuit;
   said voltage monitoring means further operated in response to said first power source having a voltage below said pre-determined level to provide a voltage failure signal;
   an isolation transistor having base, collector and emitter leads, said base lead connected to said first power source, and said emitter lead connected to said voltage monitoring means, said isolation transistor operated in response to said voltage detected signal to provide a relay driving circuit enable signal, and further operated in response to said voltage failure signal to provide a relay driving circuit disable signal;
   a relay driving circuit connected to said collector lead;
   a relay connected to said relay driving circuit;
   said relay driving circuit operated in response to said relay driving circuit enable signal to provide a relay enable signal;
   said relay operated in response to said relay enable signal to connect said second power source to said tape motor;
   said relay driving circuit further operated in response to said relay driving circuit disable signal to provide a relay disable signal;
   said relay further operated in response to said relay disable signal to disconnect said second power source from said tape motor; and
   said voltage monitoring means is further operated in response to said first power source having a voltage below said pre-determined level to disable said control circuit.

2. A low voltage protection circuit as claimed in claim 1, wherein said voltage monitoring means comprises: a voltage comparison circuit.

3. A low voltage protection circuit as claimed in claim 2, wherein: said voltage comparison circuit is powered by said second power source.

4. A low voltage protection circuit as claimed in claim 3, wherein there is further included: threshold determining means; said comparison circuit including a positive input connected to said first power source and a negative input connected to said threshold determining means.

5. A low voltage protection circuit as claimed in claim 4, wherein said threshold determining means comprises: a zener diode.

6. A low voltage protection circuit as claimed in claim 2, wherein said comparison circuit comprises: a pair of operational amplifiers connected in parallel.

7. A low voltage protection circuit as claimed in claim 4, wherein said comparison circuit further comprises: a resistive circuit connected between said first power source and said positive input.

8. A low voltage protection circuit as claimed in claim 7, wherein said resistive circuit comprises: a voltage divider.

9. A low voltage protection circuit as claimed in claim 1, wherein: there is further included, a third power source, said relay further operated in response to said relay enable signal to connect said third power source to said tape motor and further operated in response to said relay disable signal to disconnect said third power source from said tape motor.

10. A low voltage protection circuit as claimed in claim 1, wherein said relay driving circuit comprises:
a first transistor having first, second and third leads, said first lead connected to said isolation transistor and said second power source, and said second lead connected to said second power source; and
a second transistor having first, second and third leads, said first lead of said second transistor connected to said third lead of said first transistor, and said second lead of said second transistor connected to said relay.

11. A low voltage protection circuit as claimed in claim 10, wherein said relay is further connected between said first power supply and said second lead of said second transistor, and said third lead of said second transistor is connected to ground.

12. A low voltage protection circuit as claimed in claim 10, wherein said first, second and third leads of said first and second transistors comprise base, collector and emitter leads, respectively.

* * * * *